June 1, 1954
E. F. LEDBETTER
2,679,687
CAKE CUTTER AND SERVER
Filed March 16, 1953
2 Sheets-Sheet 1
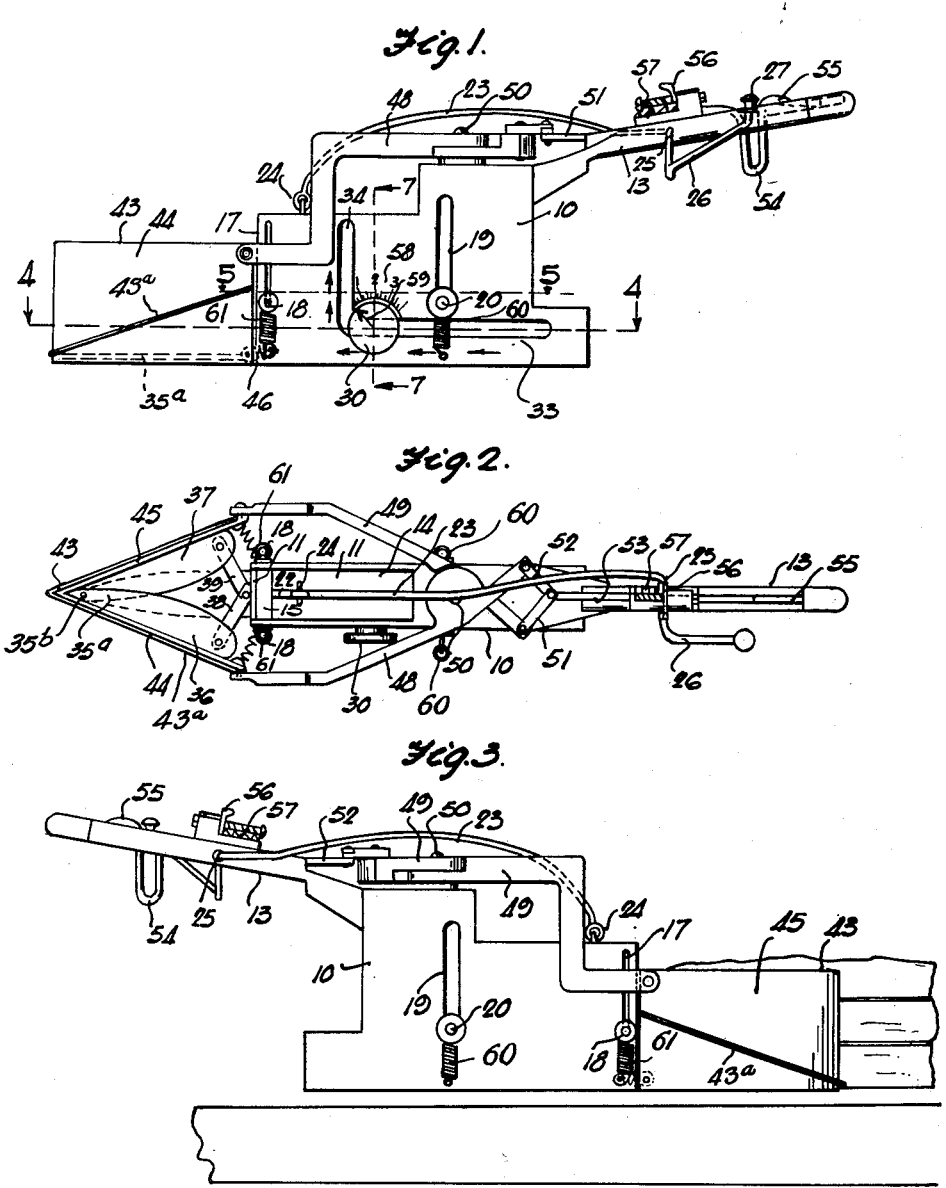
INVENTOR
ERNEST F. LEDBETTER
BY *[signature]*
HIS ATTORNEY June 1, 1954  E. F. LEDBETTER  2,679,687
CAKE CUTTER AND SERVER
Filed March 16, 1953  2 Sheets-Sheet 2
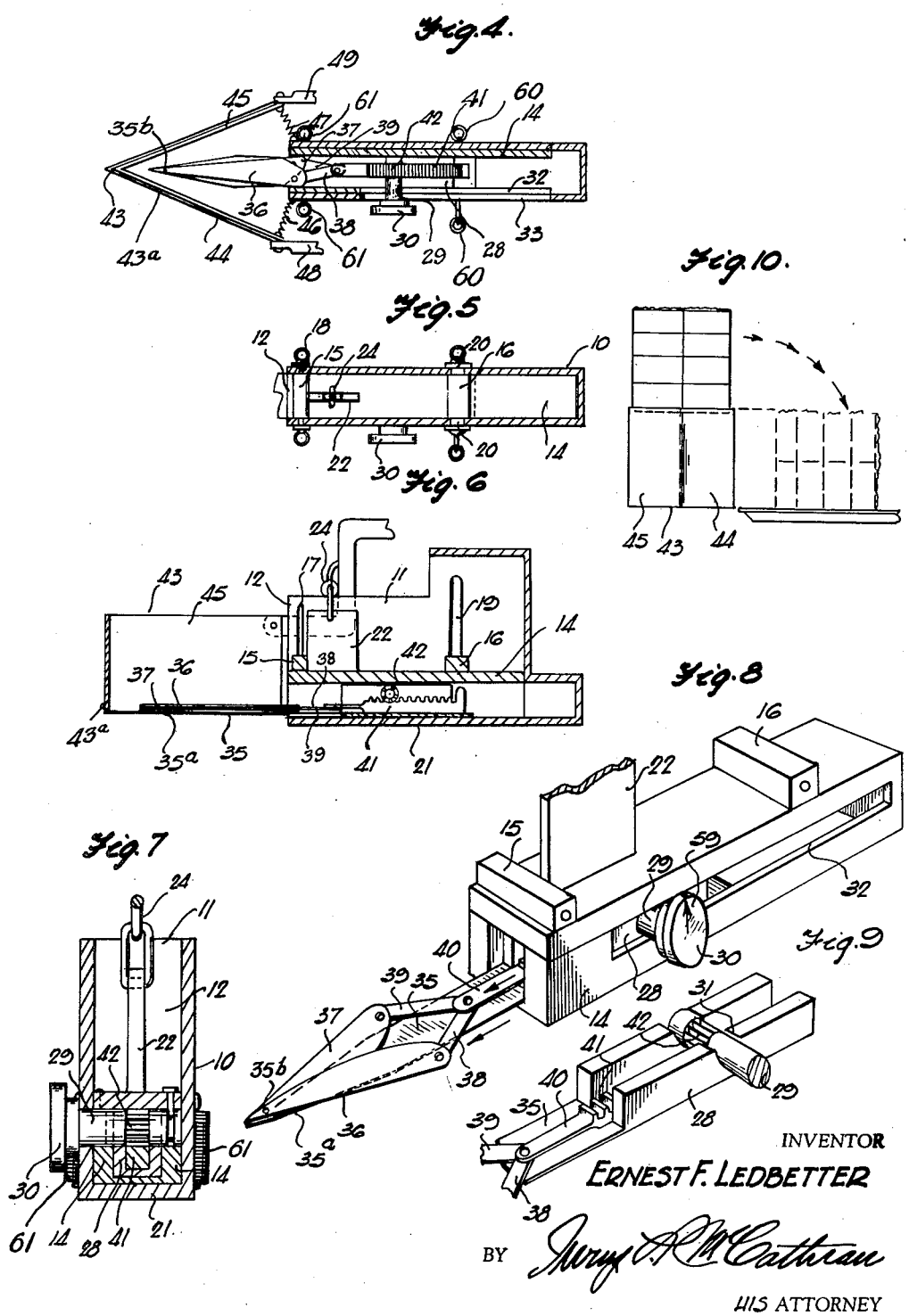
INVENTOR
ERNEST F. LEDBETTER
BY
HIS ATTORNEY Patented June 1, 1954

2,679,687

UNITED STATES PATENT OFFICE 2,679,687

CAKE CUTTER AND SERVER

Ernest F. Ledbetter, Chicago, Ill.

Application March 16, 1953, Serial No. 342,335

12 Claims. (Cl. 30—114)

This invention relates to a cake cutter and server, and has for one of its objects the production of a simple and efficient means for cutting pieces of cake of a selected size and serving the same without touching the cake with human hands.

Another object of this invention is the production of a cake cutter and server which may be adjusted to cut desired sizes of slices of cake and the like.

Other objects and advantages of this invention will appear throughout the following specification and claims.

In the drawings:

Figure 1 is a side elevational view of the cake cutter and server;

Figure 2 is a top plan view thereof;

Figure 3 is a side elevational view thereof looking at the opposite side thereof to that of Figure 1;

Figure 4 is a fragmentary horizontal sectional view taken on line 4—4 of Figure 1, with the horizontal trowel-like lifting knife in a partly retracted position;

Figure 5 is a fragmentary horizontal sectional view taken on line 5—5 of Figure 1;

Figure 6 is a fragmentary central longitudinal sectional view showing the lifting knife in a partly extended position;

Figure 7 is an enlarged fragmentary transverse sectional view taken on line 7—7 of Figure 1;

Figure 8 is a fragmentary perspective view of the lifting knife and its supporting element;

Figure 9 is a fragmentary perspective view of the lifting knife operating means;

Figure 10 is a front elevational view showing the manner in which a slice of cake is placed upon a plate after being elevated by the lifting knife.

By referring to the drawings, it will be seen that 10 designates the housing which comprises a substantially box-like structure having an opening 11 at the top and an opening 12 at the front thereof. A rearwardly extending upwardly inclined handle 13 is carried by the rear upper portion of the housing 10.

A longitudinally extending, vertically slidable guide box 14 is mounted within the housing 10. The box 14 is provided with a forward transverse cleat 15, and a rearward transverse cleat 16 upon the upper face thereof. The housing 10 is provided with vertical, guiding slots 17 arranged in lateral alignment to receive guiding pins 18 which engage the cleat 15 to guide the box 14 while it is being raised and lowered. A pair of similar vertical guide slots 19 are formed in the housing 10 rearwardly of the slots 17 and in alignment therewith. These slots 19 are transversely aligned and receive guide pins 20 which engage the cleat 16 to guide the box 14 while it is being raised and lowered and to keep the box 14 in a proper horizontal position with respect to the bottom 21 of the housing 10 during vertical adjustment of the box 14. The box 14 is provided with an upstanding neck portion 22 to which is connected the forward end of the actuating arm 23 as at 24. This arm 23 is transversely journaled as at 25, through the handle 13, and carries an operating crank portion 26 upon the opposite side of the handle 13 relative to the arm 23. A suitable upstanding knob 27 is carried by the crank portion 26 to facilitate the operation of the actuating arm 23 by the thumb or finger of the hand of an operator gripping the handle 13.

A longitudinally slidable lifting knife supporting member 28 is carried within the box 14 and supports a transverse lifting knife actuating shaft 29. An actuating knob 30 is carried by the outer end of the shaft 29. The shaft 29 is journaled in the member 28 as at 31, and extends through the longitudinal slot 32 of the box 14 and also through the horizontal guide slot 33 in one side of the housing 10 this slot 33 is provided with a right-angular vertically extending portion 34 located intermediate the slots 17 and 19, as is shown in Figure 1. The knob 30 overlies the edges of the slot 33 and the portion 34 thereof as the knob 30 is shifted longitudinally to and from a selected position.

The member 28 carries a forwardly extending blade 35 of a lifting knife 35ª, which tapers toward its outer end. A pair of laterally swinging segmental blade sections 36 and 37 are pivotally connected at their outer ends as at 35ᵇ, to the outer end of the blade 35, as shown in Figure 8. The blade 35 of the lifting knife 35ª and the blade sections 36 and 37 are made of the thinnest possible material. For the purpose of illustration, these parts are shown exaggerated as to thickness. The rear ends of the blade sections 36 and 37 are pivotally connected to the links 38 and 39 and these links 38 and 39 are pivotally connected to the forward end 40 of the rack bar 41. The rack bar 41 is longitudinally slidable within the member 28 and meshes with the pinion portion 42 of the shaft 29 to shift the rack bar 41 forwardly and rearwardly of the member 28 as the knob 30 is turned to selectively spread and retract the blade sections 36 and 37 as will be hereinafter described.

V-shaped slicing knife 43 is carried forwardly of the housing 10. This slicing knife comprises a pair of integrally connected spring blades 44 and 45 converging toward the forward end of the knife 43. The rear ends of the blades 44 and 45, if it is desired, may be attached to the housing 10 by means of resistor coil springs 46 and 47 to normally spread the diverging rear ends of the blades apart. Other types of springs may be utilized to facilitate the moving of the blades toward each other, such as the flat contracting spring 43ª which is wrapped around the diverging ends of the blades 44 and 45, within the spirit of the invention. In the form shown, the contracting spring 43ª is secured to the outer face of one of the slicing knife blades and passes over the apex of the V-shaped slicing knife and is then secured to the outer face of the companion blade of the V-shaped slicing knife. The resistor springs 46 and 47 normally hold the V-shaped knife in a spread position, and a pull on the trigger 54 pulls the rear ends of the blades 44 and 45 together or toward each other.

Horizontal toggle arms 48 and 49 are pivotally mounted on a vertical pivot 50 upon the top of the housing 10. These arms are connected at their forward ends to the rear ends of the blades 44 and 45 respectively, as shown in Figures 1, 2 and 3. The rear ends of the arms 48 and 49 are arranged in crossed relation and are pivotally connected to the respective actuating links 51 and 52. These links 51 and 52 are in turn pivotally connected to a trigger rod 53. The trigger rod 53 is provided with a trigger portion 54 which extends down through the handle 13 and depends below the handle within easy reach of the finger of the operator's hand which grips the handle 13. The rod 53 is provided with a guiding extension 55 which is slidable longitudinally of the handle to guide the rod 53 as it moves longitudinally of the handle when the trigger 54 is pulled and released by the operator. The rod 53 carries a spring actuated pawl 56 which engages the ratchet 57 carried by the handle 13 to hold the rod 53 and the knife blades 44 and 45 in an adjusted position to cut a selected size slice or segment of cake.

As is shown in Figure 1, the housing 10 carries a segmental scale 58 upon one side thereof adjacent the slot 33 and its vertical extension 34. The knob 30 is provided with an indicating arrow 59 which is adapted to register with a selected graduation on the scale 58. As is shown in the drawing, suitable tension springs 60 are connected to the guide pins 20 at their upper ends and are anchored near the bottom of the housing 10 at the opposite ends. Springs 61 also are connected to the guiding pins 18 at their upper ends and are anchored near the bottom of the housing 10 at their opposite ends. These springs 60 and 61 are adapted to retract or return box 14 to a lowered position after the lifting means 27 has been released. The lifting knife 35ª is lifted by pressing down on upstanding knob 27 as previously stated. The trigger means 54 closes the diverging ends of blades 44 and 45 and the springs 46 and 47 are designed to serve as a means to normally spread them apart. In many instances, the springs 46 and 47 may be found unnecessary, and may be eliminated within the spirit of the invention.

The operation of the device is as follows:

The knob 30 may be moved forwardly in the slot 33 so that the shaft 29 registers with the vertical extension 34. The knob 30 is then rotated so that the arrow or indicator 59 registers with a selected graduation on the scale 58 for a one inch, two inch, or three inch slice of cake. The trigger 54 is pulled until the blades 44 and 45 are brought tightly against the blade sections 36 and 37 of the lifting knife 35ª. As the knob 30 is rotated as described above, the blade sections 36 and 37 are expanded to lift a selected size of cake. When the blades 44 and 45 are set the pawl 56 automatically engages the ratchet 57 and locks the blades 44 and 45 in a set position until the pawl and ratchet are released. The knob 30 is then rotated in a reverse direction to draw the lifting blades 36 and 37 from an extended position as shown in Figures 2 and 8, to a retracted or overlapping position as shown in Figure 4. The knob 30 is then moved rearwardly to draw the member 28 and the lifting knife 35ª inwardly within the box 14. The operator holding the device in one hand by the handle 13 then moves the device downwardly over the cake in a proper position to cut a slice therefrom. The knob 30 is again moved forwardly to bring the shaft 29 into registration with the vertical portion 34 of the slot 33 and the knob 30 is again rotated to laterally extend the blades 36 and 37 to abut the inner faces of the blades 44 and 45. This will cause the blades 36 and 37 to cut the bottom of the slice of cake free from its supporting plate or pan. The operator may then press downwardly upon the upstanding knob 27 which will lift the actuating arm 23 which will in turn pull upwardly upon the upstanding neck portion 22 and in turn lift the box 14, the shaft 29 being movable through the vertical slot 34. Since the lifting knife 35ª is carried by the box 14, the knife 35ª will be moved vertically between the converging blades 44 and 45 of the slicing knife 43 to the top thereof where the slice of cake may be placed upon a plate or similar article merely by turning the device laterally at substantially right-angles to the original plane of the device, in the manner as indicated in dotted lines in Figure 10.

Having described the invention, what is claimed as new is:

1. A cake cutter and server comprising a housing, a spring actuated slicing knife comprising a pair of converging blades, adjusting arms horizontally pivoted upon said housing and supporting said slicing knife, said arms being movable to selectively draw the converging blades toward and away from each other, and means movable from a position within the housing to an outward position between the blades for lifting a slice of cake vertically between the blades.

2. A cake cutter as defined in claim 1 wherein the last mentioned means comprises a pair of laterally adjustable lifting blades.

3. A cake cutter and server comprising a housing, a lifting knife supporting box vertically movable and adjustable in said housing, a lifting knife, a member slidable in said box supporting said lifting knife and movable into and out of said box, said member having a forwardly extending blade, a pair of laterally swinging segmental blades pivoted to the outer end of said forwardly extending blade, means for laterally swinging said segmental blades, a slicing knife carried by said housing, said slicing knife having a pair of spring actuated converging cutting blades, said last mentioned means including a knob to facilitate moving said segmental blades to a position intermediate the blades of the slicing knife to support a slice of cake therebetween, and means for lifting the lifting knife within the slicing knife to facilitate the removal of a slice of cake therefrom.

4. A cake cutter and server as defined in claim 3, including means for automatically locking the cutting knife in a set adjusted position to facilitate cutting slices of cake of a selected size.

5. A cake cutter and server as defined in claim 3 including a pawl and ratchet means carried by the handle for automatically locking the cutting blades of said slicing knife in a set adjusted position to facilitate slicing a cake in selected sizes.

6. A cake cutter and server as defined in claim 3 including a pair of toggle arms carried by the top of said housing and engaging the cutting blades of said slicing knife for swinging said cutting blades toward and away from each other to facilitate cutting slices of cake of a selected size, and means for automatically locking said toggle arms in an adjusted position.

7. A cake cutter and server as defined in claim 3 wherein said means for laterally swinging said segmental blades comprises a pair of diverging links, a rack bar connected to said links, a transverse pinion shaft engaging said rack for spreading said segmental blades as said pinion shaft is rotated and said rack bar is shifted.

8. A cake cutter and server as defined in claim 3 wherein said housing is provided with vertical guiding means to guide said box in its vertically adjustable movement.

9. A cake cutter and server as defined in claim 3 wherein the housing is provided with a scale, a shaft supporting said knob, a pinion on said shaft, a rack engaging said pinion and connected to said segmental blades, and an indicator carried by said knob for registration with said scale to set the segmental blades at a selected position.

10. A cake cutter and server as defined in claim 3 wherein the housing is provided with a guide slot having a horizontal and a vertical portion, a shaft supporting said knob and actuating said segmental blades and passing through said guide slot to facilitate the movement of said box in a vertically adjusted position.

11. A cake cutter and server as defined in claim 3 wherein the last mentioned means comprises an actuating rod connected to said box and journaled on said handle, and an actuating knob connected to said actuating rod to facilitate the vertical swinging of said actuating rod to raise said box and lifting handle.

12. A cake cutter and server as defined in claim 3 wherein tension springs are connected to the housing and lifting knife supporting box for returning the lifting box to its normal position when the means for lifting the lifting knife is released.

References Cited in the file of this patent

UNITED STATES PATENTS

| Number | Name | Date |
|---|---|---|
| 2,571,465 | McDevitt | Oct. 16, 1951 |
| 2,622,912 | Schroeder | Dec. 23, 1952 |

FOREIGN PATENTS

| Number | Country | Date |
|---|---|---|
| 299,388 | Germany | July 11, 1917 |